(No Model.)
L. J. HIRT.
AUTOMATIC SPRINKLER SYSTEM.
No. 540,549. Patented June 4, 1895.
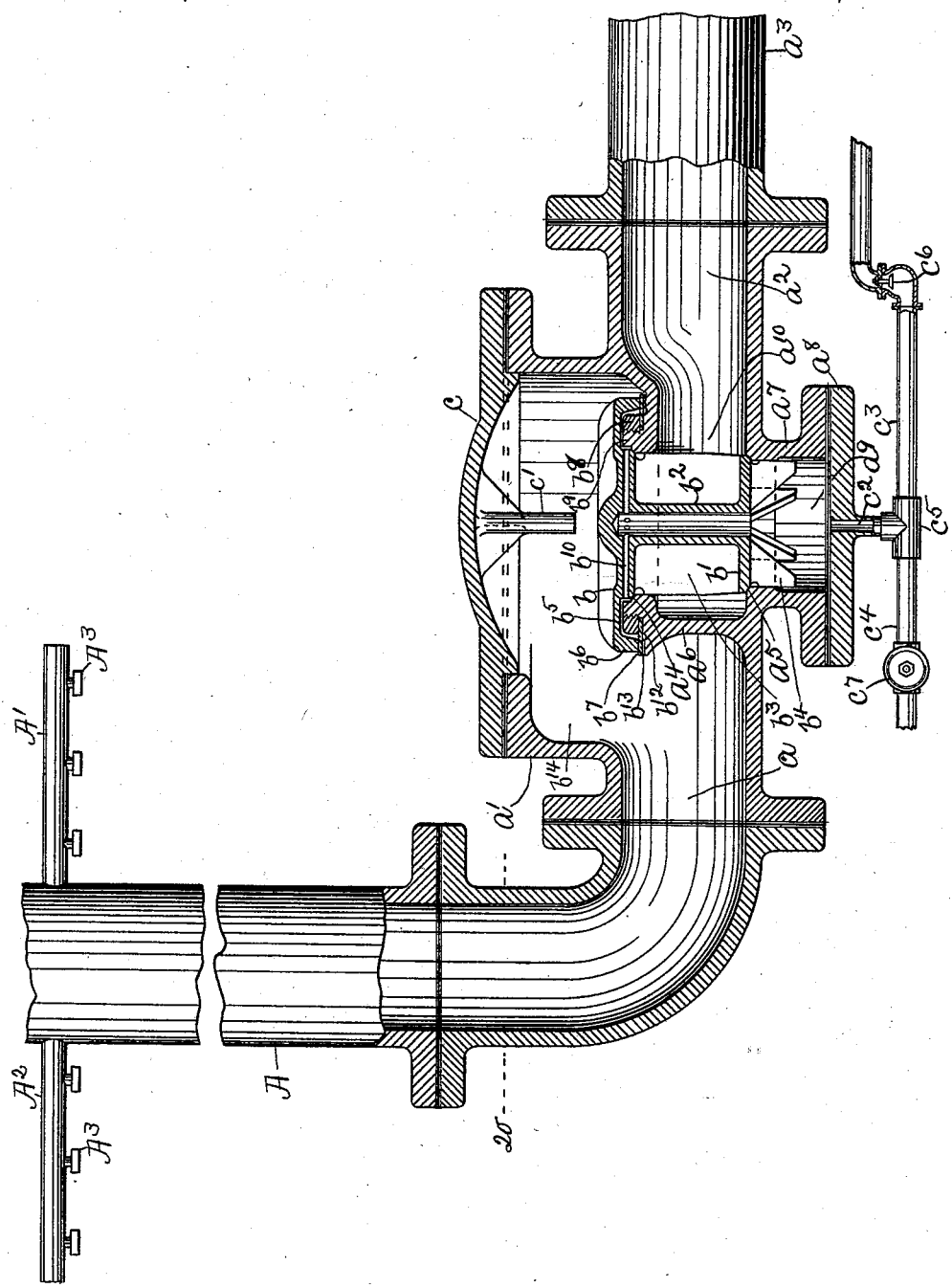
WITNESSES.
Matthew M. Blunt.
J. Murphy.
INVENTOR.
Louis J. Hirt
by Jas. H. Churchill
Atty.

UNITED STATES PATENT OFFICE.

LOUIS J. HIRT, OF SOMERVILLE, MASSACHUSETTS.

AUTOMATIC SPRINKLER SYSTEM.

SPECIFICATION forming part of Letters Patent No. 540,549, dated June 4, 1895.

Application filed January 30, 1894. Serial No. 498,477. (No model.)

*To all whom it may concern:*

Be it known that I, LOUIS J. HIRT, residing in Somerville, in the county of Middlesex and State of Massachusetts, have invented an Improvement in Automatic Sprinkler Systems, of which the following description, in connection with the accompanying drawing, is a specification, like letters on the drawing representing like parts.

This invention relates to an automatic fire extinguishing system of that class known as the dry pipe system, in which the distributing pipes are filled with air under light pressure and in which the supply of water to the distributing pipes is cut off as long as the said pressure is maintained, but which supply is admitted into the distributing pipes by a diminution of pressure as by the opening of an automatic sprinkler in a distributing pipe.

My present invention relates more particularly to a novel valve mechanism for controlling the supply of water to the distributing pipes, and has for its object to provide a more efficient valve mechanism, which can be maintained closed by a minimum air pressure in the distributing pipes; which, when operated, is maintained open and cannot be seated while the water pressure is maintained, and which is self-draining, accessible and can be readily and easily tested.

In accordance with this invention, I employ a substantially balanced valve consisting of two valves or heads connected together and preferably attached to a common stem and separated from each other and co-operating with two valve seats in a casing or fitting, having its fluid inlet between the said valve seats, so that when the two valves are seated, the fluid pressure acts upon the upper surface of one valve and the under surface of the other valve, which under surface exposed to the water pressure is a trifle or substantially a little larger than the upper surface of the other valve, whereby the double valve is substantially balanced and requires only a small additional area of the upper surface of the said upper valve in excess of its lower surface to be operated upon by light air pressure, to maintain the valves seated against a substantially large fluid pressure, thereby permitting the valves to be made of minimum size. The lower valve controls the entrance of fluid from the fluid inlet of the valve casing or fitting into a drip well normally communicating with the atmosphere, the said drip well being filled with fluid when the lower valve is opened, so that the said valve after being opened by the action of a sprinkler is maintained opened by the fluid in the said well until the latter is emptied of its water as will be described. The upper valve may be provided, for the best results, with drainage channels which communicate with the drip well as will be described, and the said upper valve is provided with a second valve seat, which is flexible and has its under surface exposed to pressure in the normal condition of the valve, whereby the said valve may be maintained closed on its flexible seat, when the main valve is temporarily opened by an increase in pressure in the water main or supply pipe, as will be described. The valve fitting or casing may be provided with a removable cap or cover by which access may be had to the valves for repairs and other purposes.

These and other features of this invention will be pointed out in the claims at the end of this specification.

The drawing represents in elevation, partially broken out, a sufficient portion of a dry-pipe system of automatic sprinklers embodying this invention to enable it to be understood.

The main distributing pipe A is provided with branch pipes A' A² having automatic sprinklers A³, made of any usual or suitable construction, such as now commonly employed in automatic fire extinguishing sprinkler systems.

The main distributing pipe A is connected to or communicates with the outlet port or passage $a$ of a valve fitting or casing $a'$, having its inlet port or passage $a^2$ connected to or communicating with a fluid supply pipe $a^3$, which latter in practice, may be connected with a suitable source of supply, such as a street main.

The valve fitting or casing $a'$, in accordance with this invention, is provided with two main valve seats $a^4$ $a^5$, the valve seat $a^4$, as represented in the drawing, being formed on the inner circumference of an annular upright wall $a^6$ erected from the bottom of the valve fitting $a'$, and the valve seat $a^5$ being formed by an annular opening in the bottom of the said valve fitting or casing, the said annular opening having its annular wall $a^7$ projected downward below the bottom of the valve casing, and forming with a suitable cap or cover $a^8$, a well $a^9$ for a purpose as will be described. The annular wall $a^6$ is provided between the valve seats $a^4$ $a^5$ with a fluid inlet $a^{10}$ constituting practically a continuation of the fluid inlet $a^2$. The valve seats $a^4$ $a^5$ have co-operating with them a substantially balanced valve consisting of two valves or heads $b$ $b'$ connected together and preferably secured to or forming part of a common valve stem $b^2$, and for the best results, the said valves are joined by preferably a plurality of vertical wings or guide-arms $b^3$, which co-operate with the inner wall of the valve opening controlled by the valve $b$ and serve to guide and maintain the valves in proper position. The lower valve $b$ is also preferably provided with a series of wings, guide walls or arms $b^4$, which extend into the well $a^9$.

The valve $b$ is preferably a double seated valve and is provided on its under side with an annular groove $b^5$ forming an outer annular flange $b^6$, forming an auxiliary to the valve $b$ and which co-operates with preferably a packing ring $b^7$ of rubber or other suitable material forming the second and flexible seat for the valve $b$, which packing ring in the present instance, rests upon an annular ledge on the wall $a^6$ and is secured in place by a ring $b^8$ screwed upon a threaded extension $b^9$ of the wall $a^6$. The valve stem $b^2$ for the best results is made hollow and communicates with the annular channel or groove $b^5$ by preferably a series of ducts or passageways $b^{10}$ made in the valve $b$, for a purpose as will be described. The annular ledge upon which the packing ring or flexible valve seat $b^7$ rests is also preferably provided with a substantially small annular groove or channel $b^{12}$, which is connected by a series of small grooves $b^{13}$ with the chamber $b^{14}$ of the casing or valve fitting $a$ for a purpose as will be described.

The valve fitting may and preferably will be provided on its top with a removable cap or cover $c$, which in the present instance is shown as provided with a depending stud $c'$, adapted to co-operate with the valve $b$, and form a stop to limit the upward movement of the valve when the latter is opened, as will be described.

The cap $a^8$ for the drip well $a^9$ is shown in the present instance as provided with a discharge opening $c^2$, with which communicate pipes $c^3$ $c^4$ shown as connected to a T $c^5$, the pipe $c^3$ in practice communicating with the atmosphere and being provided with a check valve $c^6$ normally open to permit of the escape of leakage from the drip well $a^9$, but which is adapted to be closed when water flows through the pipe $c^3$ under pressure. The pipe $c^4$ is provided with a cock or valve $c^7$ which is normally closed, but which in practice may be opened to seat the valves $b$ $b'$ as will be described.

The valve casing $a'$ in practice will be secured water tight to the pipes A, $a^3$, by suitable bolts in the usual manner and not herein shown, and the caps $a^8$ and $c$ in practice may also be secured to the valve fitting by suitable bolts. Not herein shown.

The under surface of the valve $b$ exposed to the full fluid pressure is a trifle or substantially a little larger than the upper surface of the valve $b'$ also exposed to the full fluid pressure, as for instance, the diameter of the area of the under surface of the valve $b$ may be supposed to be in a full size apparatus, four and eight-sixteenths inches, while the diameter of the area of the upper surface of the valve $b'$ is four and seven-sixteenths. The valves are therefore nearly balanced and in order that the valve mechanism may be of minimum size and that the air pressure may also be of a minimum amount the upper surface of the valve $b$, which is exposed to the light air pressure need only be of such additional area over the under surface of the said valve as will balance the difference in area acted upon by full fluid pressure between the under surface of the valve $b$ and the upper surface of the valve $b'$, and for this reason, the area of the upper surface of the valve $b$ exposed to light air pressure may be made much less than if the light air pressure alone was required to balance the full fluid pressure in the supply pipe $a^3$, and for the same reason the area of the upper surface of the valve $b$ may be made much less than if the air pressure is reduced to substantially nothing.

The seat $b^7$ for the flange $b^6$ on the valve $b$ is lower than the valve seat $a^4$ and as a result, the action of the valve $b$ is accelerated similar to a steam pop valve, the water passing from the valve seat $a^4$ to the seat $b^7$ acting like an eddy and giving a pop action to the said valve.

The apparatus as herein represented in the drawing is in its normal or operative condition, the upper side of the valve $b'$ and the lower side of the valve $b$ being acted upon by the fluid in the supply pipe, which is under considerable pressure, say for instance one hundred and thirty pounds.

The fluid pressure admitted into the valve casing or fitting between the valve seats $a^4$ $a^5$ and acting upon the upper seat of the valve $b'$ and the lower seat of the valve $b$, substantially balances the double valve so that only a substantially small additional area of the valve $b$ is required, as above described, to be acted upon by the light air pressure, which is supposed to be contained in the distributing pipe $a$ and in the chamber $b^{14}$ of the valve casing, and this light air pressure by reason of the substantially small amount required to seat the valves owing to the substantially balanced condition of the same, may be a minimum amount and in practice ten pounds light air pressure has been found to be sufficient with the valve mechanism herein shown to overcome the fluid pressure of one hundred and thirty pounds in the supply pipe, so as to maintain the valves $b\ b'$ seated and enable the said valves to be made of the minimum size.

The operation of the apparatus may be briefly described as follows: When an automatic sprinkler $A^3$ in a branch distributing pipe is opened, the light air pressure acting upon the upper face of the valve $b$ is reduced, thereby permitting the fluid pressure normally between the valves $b\ b'$ to lift the valve $b$ from its seats $a^4\ b^7$, which at the same time lifts the valve $b'$ from its seat $a^5$. The fluid from the supply pipe $a^3$ passes through the inlet ports $a^2\ a^{10}$ into the drip well $a^9$, from which latter the water passes through the pipe $c^3$ with sufficient force to seat the check valve $c^6$ and thereby prevent the fluid under pressure escaping to the atmosphere. The water passing through the valve opening into the chamber $b^{14}$ fills the distributing pipe A and branch distributing pipes A' and passes out therefrom by the sprinklers which have been opened. After the valves $b\ b'$ have been opened, they are prevented from being accidentally seated, as by a momentary interruption in the flow of water from the supply pipe $a^3$, by reason of the volume of water in the drip well $a^9$, which at such time is filled. The guide arms $b^4$ act as a piston extended into the drip well, so that the water in the said well must be displaced sufficiently before the valves can be seated, and by reason of the check valve $c^6$ being closed, this displacement cannot take place until the valve $c^7$ is positively opened by an operator. As a result, the system is not rendered inoperative by a momentary interruption of the water supply, but the valves are maintained by the water in the drip well, a sufficient distance from their seats to permit the water supply to again open wide the said valves. In other words, the water in the drip well acts as a hydraulic agent or means for preventing the valves returning to their seats while the system is supposed to be in operation.

When it is desired again to seat the valves $b\ b'$, the admission of water to the supply pipe $a^3$ may be cut off, and the valve $c^7$ in the branch pipe $c^4$ is opened so as to permit the water in the drip well $a^9$ to empty itself through the pipe $c^4$, which permits the valve $b'$ and the valve $b$ to descend by gravity on to their respective seats.

In practice it frequently happens that the pressure in the water main or supply pipe $a^3$ is momentarily increased, and this is especially true when a pump is employed, which pump is located near the valve mechanism. Oftentimes, in practice, the pressure in the main $a^3$ is increased as much as from fifteen to twenty pounds, due to the pulsations in the water main $a^3$ caused by the pump, and this increase in pressure, if not provided for, would lift the valve $b$ from its seat $a^4$ and permit water to run into the chamber $b^{14}$, thereby water-locking the air valve $b$ with dead weight, which weight added to the air pressure in the system renders the valve inactive for future work. To provide for such momentary increase in the pressure of the water in the main $a^3$, the flange $b^6$, the flexible seat $b^7$, the groove $b^5$ and channels $b^{10}$, together with the annular groove $b^{12}$ and grooves $b^{13}$ are made; for by reason of the grooves $b^{13}$ communicating with the chamber $b^{14}$, the pressure in the said chamber is permitted to pass through the grooves $b^{13}$ into the annular groove or channel $b^{12}$ and to act on the under side of the flexible valve seat $b^7$, which is, therefore, pressed upward against the depending flange $b^6$ or second member of the valve $b$. By so doing, if the valve $b$ should be raised from its seat $a^4$ by a momentary increase in pressure, as for instance by the pulsations in the water main caused by the pump as above explained, the valve would still be seated on the flexible seat, and the water which would pass the valve seat $a^4$ when the valve $b$ was lifted from said seat by the excess of pressure would pass by the valve seat $a^4$ into the groove $b^5$, from whence it would take the course of least resistance and would pass through the passages $b^{10}$ into the hollow valve stem, thence to the drip well and out to the atmosphere.

By removal of the cap $c$, the valve mechanism is rendered readily accessible and can be quickly and easily inspected and tested.

In practice, the chamber $b^{14}$ of the valve casing and the distributing pipe A will contain a volume of water substantially to the level indicated by the dotted line 20 so as to cover the valve $b$, and which water in the present instance is not herein represented, and after the system has been operated and the pipe A is filled with water, the latter may be drained off from the pipe A down to the level indicated by the line 20, by means of a suitable drainage pipe, not herein shown, but which may be tapped into the pipe A.

I claim—

1. In a dry pipe system of automatic sprinklers, a valve casing provided with a fluid inlet and with a chamber to contain a lighter pressure than the fluid inlet, a rigid valve seat interposed between the fluid inlet and the light pressure chamber, a flexible valve seat interposed between the said fluid inlet and the light pressure chamber and beyond or outside of the rigid valve seat, a double valve cooperating with said seats, and a fluid outlet or drainage passage between the two valves when seated, the flexible valve seat being exposed to the action of the pressure in the said chamber to maintain it in contact with its cooperating valve, for the purpose specified.

2. In a dry pipe system of automatic sprinklers, a valve casing or fitting provided with an upright wall provided with a valve seat $a^4$ and with a second flexible valve seat $b^7$ lower than and outside of the valve seat $a^4$, a valve seat $a^5$ in said casing, and valves $b$ $b'$, the valve $b$ being constructed to co-operate with the valve seat $a^4$ and provided with a depending flange $b^6$ co-operating with the valve seat $b^7$, the valve $b'$ co-operating with the valve seat $a^5$, substantially as described.

3. A valve casing provided with a fluid inlet, a chamber to contain a lighter pressure than the fluid inlet, and with a drip well, a double valve to control the admission of fluid from the said inlet to the said chamber, a flexible seat for one of said valves exposed to the action of the pressure in the said chamber to keep it in contact with its co-operating valve, a groove or channel intermediate of the two members of the said double valve when seated, a drainage port or passage in communication with the said intermediate groove or channel and with the said drip well, and a valve to control the admission of fluid from the said inlet into the said drip well, substantially as described.

4. In a dry pipe system of automatic sprinklers, the combination of the following instrumentalities, viz:—a water supply pipe, a distributing pipe having sealed automatic sprinklers and containing light air pressure, a valve fitting interposed between the supply pipe and the main distributing pipe and provided with a fluid outlet connected to the main distributing pipe, a fluid inlet connected to the fluid supply pipe and a drip well normally communicating with the atmosphere, two valve seats between the fluid inlet and the said fluid outlet, one of which is flexible and exposed to the action of the light air pressure to keep it in contact with its co-operating valve as described, a valve seat between the fluid inlet and the said drip well, a double valve co-operating with the said valve seats between the fluid inlet and the fluid outlet, a single valve co-operating with the valve seat between the fluid inlet and the drip well, a hollow valve stem connecting said double and single valves, a groove $b^5$ in said double valve intermediate of the two valve seats with which said double valve co-operates, and a port or passage connecting said groove with the hollow valve stem, substantially as described.

In testimony whereof I have signed my name to this specification in the presence of two subscribing witnesses.

LOUIS J. HIRT.

Witnesses:
JAS. H. CHURCHILL,
J. MURPHY.